United States Patent [19]

Saini

[11] Patent Number: 5,142,635

[45] Date of Patent: Aug. 25, 1992

[54] METHOD AND CIRCUITRY FOR PERFORMING MULTIPLE STACK OPERATIONS IN SUCCESSION IN A PIPELINED DIGITAL COMPUTER

[75] Inventor: Avtar Saini, San Jose, Calif.

[73] Assignee: Intel Corporation, Santa Clara, Calif.

[21] Appl. No.: 334,920

[22] Filed: Apr. 7, 1989

[51] Int. Cl.$^5$ ............................................... G06F 9/32
[52] U.S. Cl. ................................... 395/375; 395/425;
364/DIG. 1; 364/231.8; 364/244.3; 364/255.1;
364/262.9
[58] Field of Search ... 364/200 MS File, 900 MS File;
395/425, 375, DIG. 1

[56] References Cited

U.S. PATENT DOCUMENTS

| | | | |
|---|---|---|---|
| 3,786,432 | 1/1974 | Woods | 364/200 |
| 3,889,243 | 6/1975 | Drimak | 364/200 |
| 4,524,416 | 6/1985 | Stanley | 364/200 |
| 4,890,221 | 12/1990 | Gage | 364/200 |
| 4,984,151 | 1/1991 | Dujavi | 364/200 |
| 5,006,980 | 4/1991 | Sanders | 364/200 |

*Primary Examiner*—Thomas C. Lee
*Assistant Examiner*—Eric Coleman
*Attorney, Agent, or Firm*—Blakely, Sokoloff, Taylor & Zafman

[57] ABSTRACT

A method for performing consecutive instructions to push data onto a stack in memory in a digital computer is described. During a first clock cycle, an instruction is decoded requiring a stack push operation. A control indicator is also generated calling for a stack push operation. During a phase one of a second clock cycle, (a) a stack pointer value stored in a selected stack pointer register is written onto a first bus, the selected stack pointer register being one of either the first stack pointer register or the second stack point register, and (b) the stack pointer value stored in the selected stack pointer register is written into an input latch of a stack pointer adder. During a phase two of the second clock cycle, (a) a stack memory address is formed by using the stack pointer value on the first bus, (b) the stack pointer value stored in the input latch of the stack pointer adder is decremented by a delta amount to form an updated stack pointer value, and (c) the updated stack pointer value is stored in an output latch. During a phase one of a third clock cycle, (a) the updated stack pointer value stored in the output latch is written onto a second bus, and (b) the updated stack pointer value on the second bus is written into a second stack pointer register for storage. During a phase two of a third clock cycle, (a) data is written to memory for storage at a memory location indicated by the stack memory address, and (b) the updated stack pointer value from the second stack pointer register is written into the first stack pointer register for storage. A method for performing consecutive instructions to pop data off a stack in memory in a digital computer is also described. In a digital computer with memory, circuitry for performing a stack operation is also described.

12 Claims, 8 Drawing Sheets

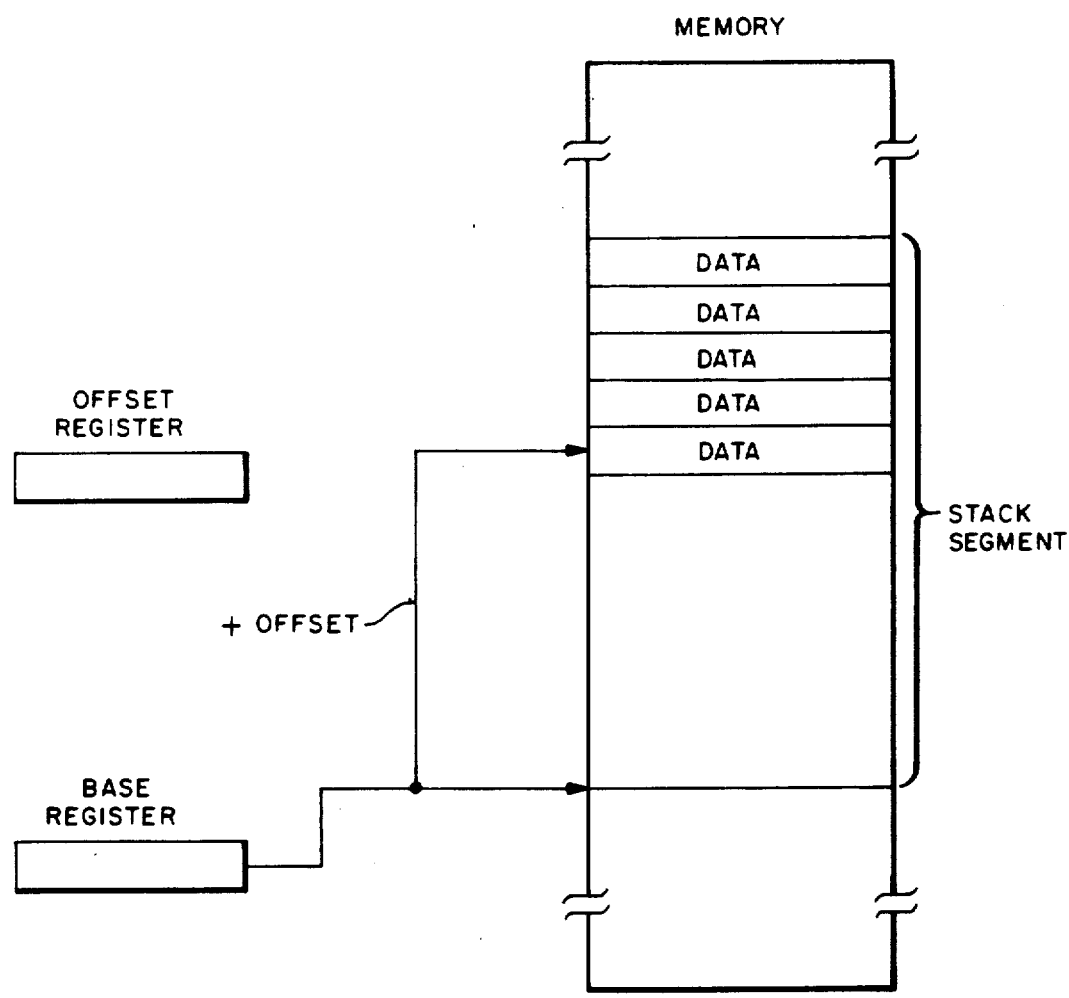
FIG_1 (PRIOR ART)

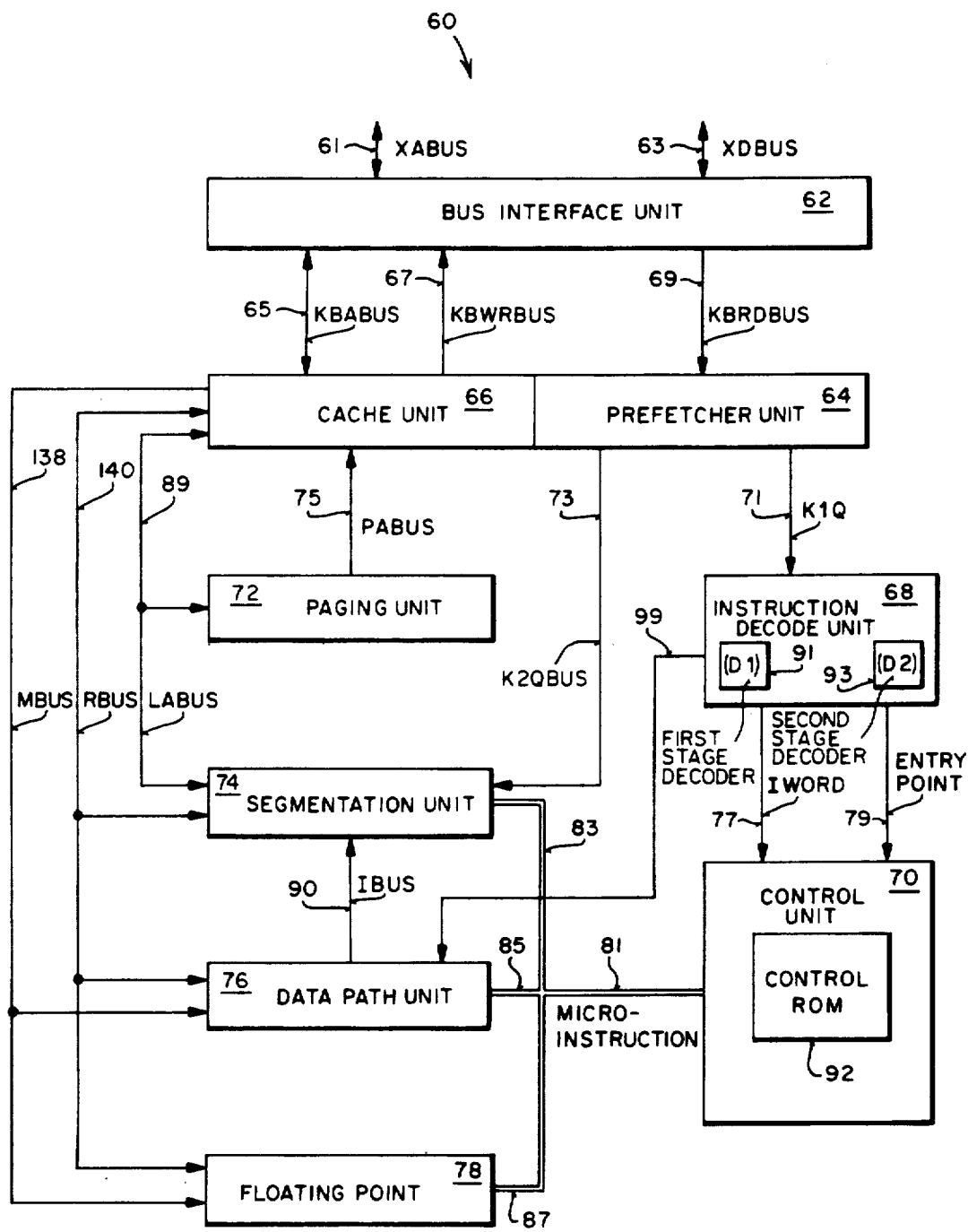
FIG_2

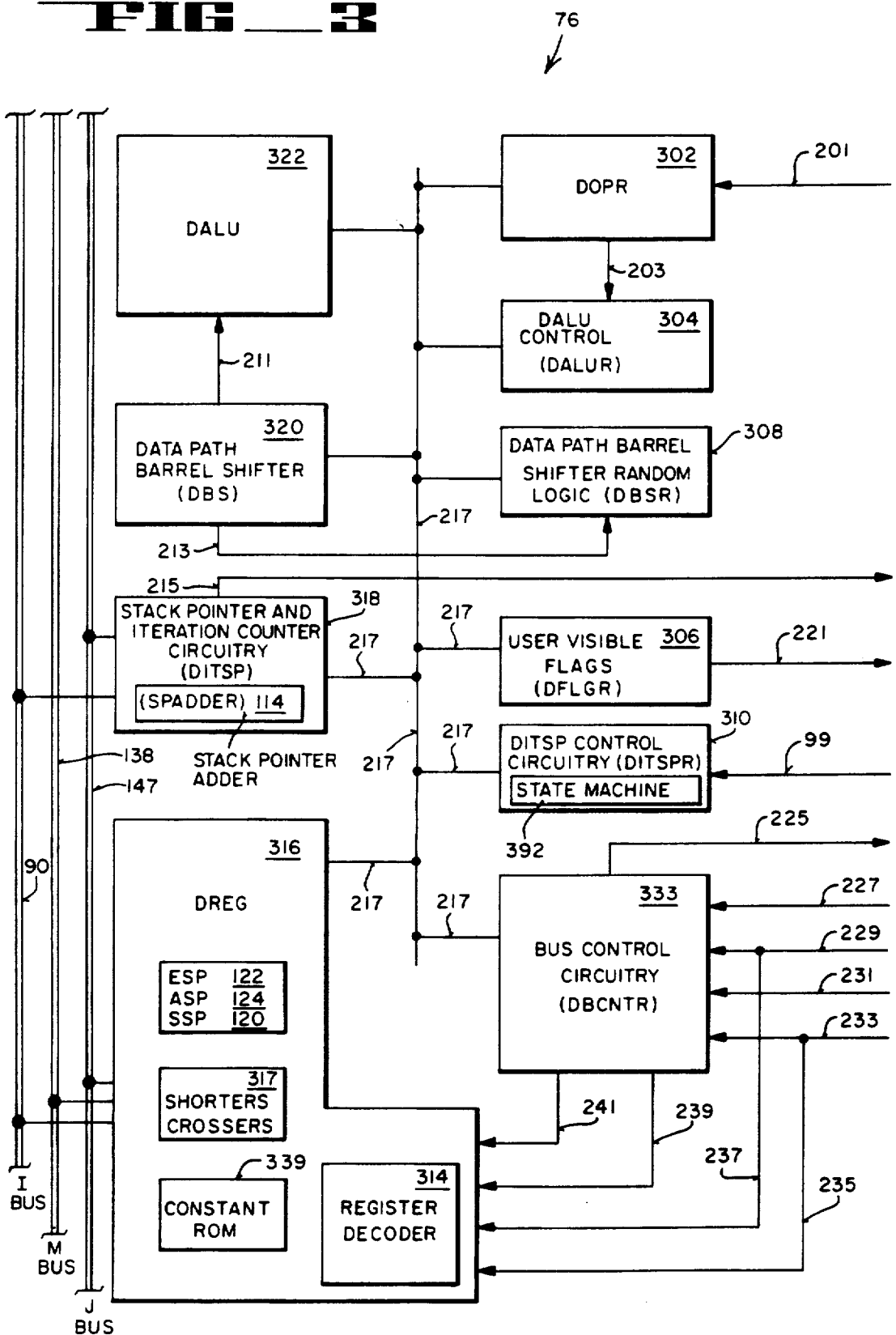

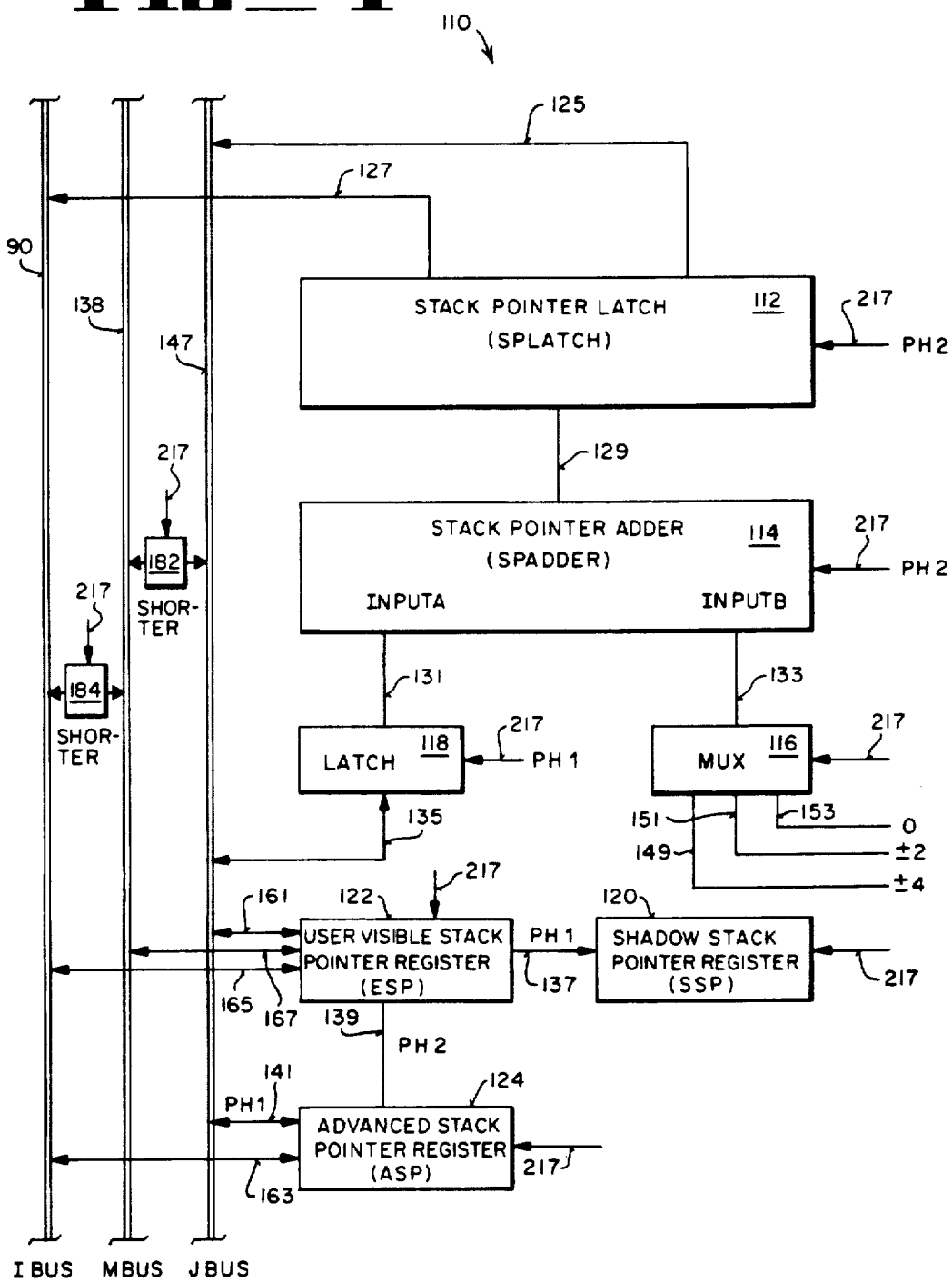

FIG_5A

|   | 1 (D1) | 2 (D2) | 3 (E) | 4 | 5 |   |
|---|---|---|---|---|---|---|
|   | FIRST DECODE STAGE 601 | SECOND DECODE STAGE 602 | EXECUTION STAGE 603 | 604 | 605 | PUSH REG |
| 501 | D1PLA: | : | : | : | : |   |
| 502 | : | : | TLB :CACHE | : | : |   |
| 503 | : | ISPVL1 | ESP->:LAAAD | : | : |   |
| 504 | : | : | IBUS: | RGXTR: | : |   |
| 505 | : | : | :RGDCD | : | : |   |
| 506 | : | : | GDEL1:SPADD | ASP<-: | : |   |
| 507 | : | : | : | SSP<-:ESP<- | : |   |
|   |   | D1 | D2 | E |   | PUSH REG |
| 508 | : | D1PLA: | : | : | : |   |
| 509 | : | : | : | TLB :CACHE | : |   |
| 510 | : | : | ISPVL2 | ASP->:LAADD | : |   |
| 511 | : | : | IBUS: | RGXTR: | : |   |
| 512 | : | : | :RGDCD | : | : |   |
| 513 | : | : | GDEL2: | ASP<-: | : |   |
| 514 | : | : | :SPADD | : | : |   |
| 515 | : | : | : | SSP<-:ESP<- | : |   |
|   |   |   | D1 | D2 | E | PUSH REG |
| 516 | : | : | D1PLA: | : | : |   |
| 517 | : | : | : | ISPVL3 | ASP->:LAADD TLB :CACHE |   |
| 518 | : | : | : | IBUS: | : |   |
| 519 | : | : | : | :RGDCD | : |   |
| 520 | : | : | : | GDEL3: | ASP<-: |   |
| 521 | : | : | : | :SPADD | : |   |
| 522 | : | : | : | : | SSP<-:ESP<- |   |
|   |   |   |   |   |   | POINTER UPDATE |
| 523 | :ASP | :->ASP | :->ASP | :->ASP | :ASP |   |
| 524 | :->ESP | :ESP | :ESP | :ESP | :->ESP |   |
| 525 | :SSP | :SSP | :SSP | :SSP | :SSP |   |

FIG __ 5B

LEGEND:

D1PLA: INSTRUCTION PREFETCH IS DECODE

ISPVAL: ISPVAL SENT DITSPR CONTROL

ESP→IBUS: STACK POINTER VALUE ON ESP PLACED ON IBUS

GDEL: GDEL SENT TO MULTIPLEXER

LAADD: LINEAR ADDRESS FORMED AND PLACED ON LA BUS

RGDCD: DECODE WHICH REGISTER IS TO HAVE ITS DATA PLACED ON STACK

SPADD: STACK POINTER DECREMENTED AND PLACED IN SPLATCH

TLB: PAGING ADDRESS IS FORMED

ASP←: UPDATED STACK POINTER VALUE PLACED IN ASP

SSP←: STACK POINTER VALUE IN ESP WRITTEN INTO SSP

CACHE: DATA PUSHED ONTO STACK IN MEMORY

ESP← VALUE OF STACK POINTER IN ASP TRANSFERRED INTO ESP

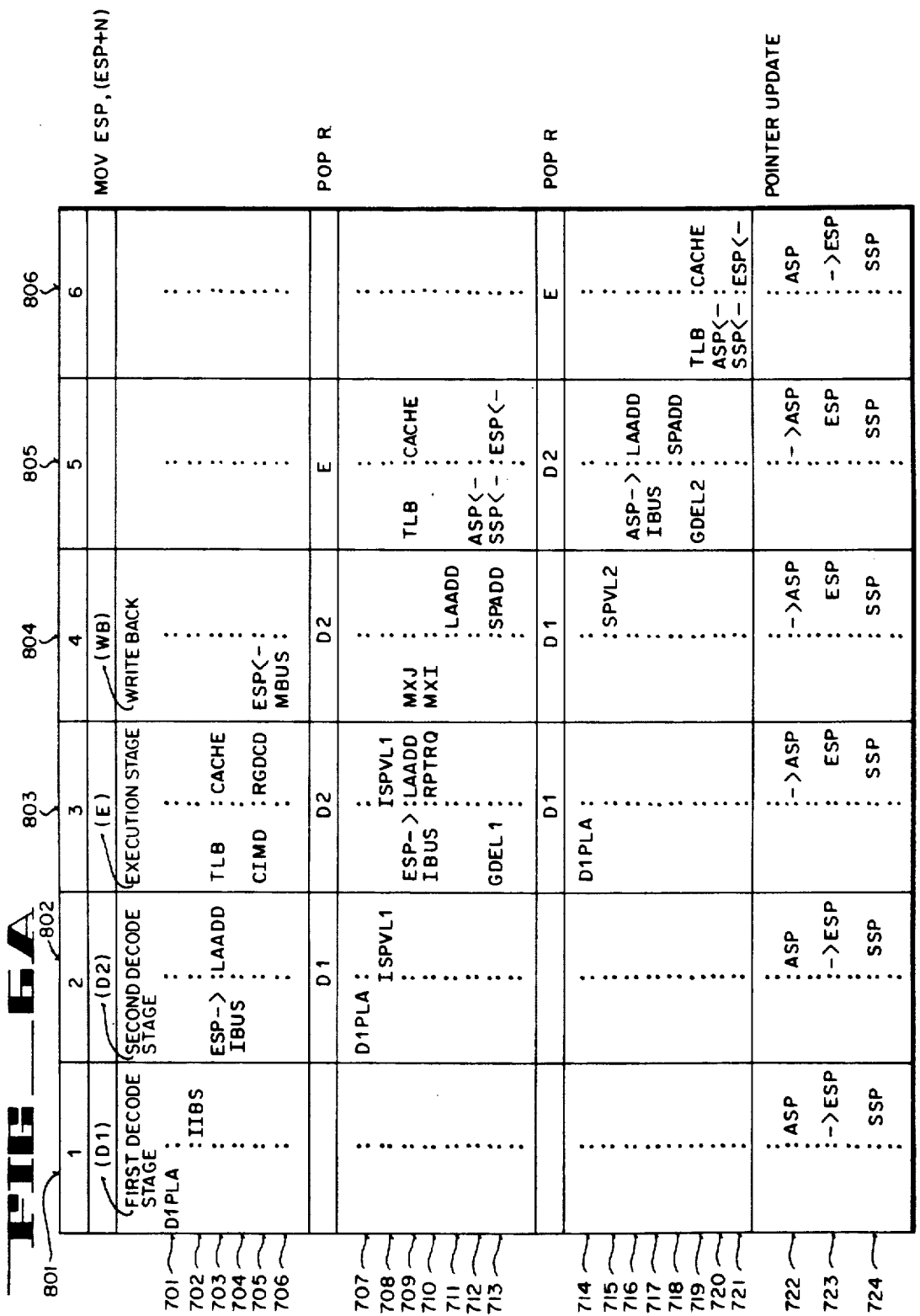

FIG_6B

LEGEND:

D1PLA: INSTRUCTION DECODE

IIBUS: REQUEST TO WRITE TO ESP

ESP→IBUS: ESP VALUE MOVED ONTO IBUS

LAADD: LINEAR ADDRESS FORMED AND PLACED ONTO LABUS

CIMD: MICROINSTRUCTION FIELD

RPTRQ: REPEAT PORTIONS OF 2ND DECODE STAGE

MXJ: MBUS SHORTED TO JBUS

MXI: MBUS SHORTED TO IBUS

METHOD AND CIRCUITRY FOR PERFORMING MULTIPLE STACK OPERATIONS IN SUCCESSION IN A PIPELINED DIGITAL COMPUTER

FIELD OF THE INVENTION

The present invention pertains to the field of stack operations on a digital computer. More particularly, this invention relates to improving the performance of stack operations on a digital computer that uses pipelined instructions.

BACKGROUND OF THE INVENTION

In computer architecture, a stack is a data structure wherein the value most recently stored is the first value retrieved. The acronym LIFO (last in, first out) describes the action of a stack.

The 80386 32-bit CHMOS microprocessor sold by Intel Corporation of Santa Clara, Calif. is an example of one prior digital computer using a stack. The 80386 microprocessor uses a memory addressing technique called segmentation, wherein the memory space is divided into one or more separate linear regions called segments. A memory address consists of two parts—namely, a segment part that identifies the segment, and an offset part that gives a byte offset within the segment. Both the segment and the offset must be specified for every memory reference. A compiler defines one of the segments as the stack segment.

FIG. 1 illustrates in simplified form the stack memory organization for the prior 80386 microprocessor. On the 80386 microprocessor, the stack grows towards lower addresses, and thus the stack appears to grow downward. In the 80386 microprocessor, the location of the data stored in the stack is defined by the address of the base register plus an offset. On the 80386 microprocessor, the base value contained in a base register plus the offset contained in register ESP identifies the memory location that is the top of the stack. For the 80386 microprocessor, the "top" of the stack is memory location with the lowest address in the stack where data is currently being stored.

The two basic stack operations are push and pop. The push operation adds a new element to the stack, and the pop operation removes the last element pushed. The most recently pushed data value resides in a memory location at the "top" of the stack.

In another prior approach, a register or registers point to the next memory location following the memory location containing data most recently pushed onto the stack.

A stack operation is really two distinct operations in one. For example, a push operation is a move to the external memory and a decrementing of the stack pointer. A pop operation is a move from the external memory and an incrementing of the stack pointer.

In a prior approach to stack operations, a Push register instruction results in the stack pointer being decremented by the word length and then an address being created using the new value. The contents of the register specified are then written to this new address. For a prior Pop register instruction, data is fetched from memory using the value in the stack pointer. The data arriving from memory is written to the register and the stack pointer is incremented. This prior approach is found on the 80386 microprocessor and allows the microprocessor to do a push register instruction in two clocks, and a pop register instruction in four clocks.

One disadvantage to this prior approach for performing stack operations is that it is relatively time consuming, given that multiple clock cycles are required. This prior approach therefore imposes a relative performance penalty, especially in view of the fact that numerous stack push and pop instructions can appear within a given computer program.

SUMMARY AND OBJECTS OF THE INVENTION

In view of limitations of known systems and methods, one of the objectives of the present invention is to provide a method and circuitry to reduce the number of clock cycles required to perform a stack operation.

Another objective of the present invention is to provide a method and circuitry to execute a stack push operation in one clock cycle.

Another objective of the present invention is to provide a method and circuitry to execute a stack pop operation in one clock cycle.

Another objective of the present invention is to provide a method and circuitry for performing back-to-back stack operations in a digital computer with pipelined instructions.

These and other objects of the invention are provided for by a method and circuitry for performing consecutive instructions to push data onto a stack in memory in a digital computer. During a first clock cycle, an instruction is decoded requiring a stack push operation. A control indicator is also generated calling for a stack push operation. During a phase one of a second clock cycle, (a) a stack pointer value stored in a selected stack pointer register is written onto a first bus, the selected stack pointer register being selected from the first stack pointer register and the second stack pointer register, and (b) the stack pointer value stored in the selected stack pointer register is written into an input latch of a stack pointer adder. During a phase two of the second clock cycle, (a) a stack memory address is formed by using the stack pointer value on the first bus, (b) the stack pointer value stored in input latch of the stack pointer adder is decremented by a delta amount to form an updated stack pointer value, and (c) the updated stack pointer value is stored in an output latch. During a phase one of a third clock cycle, (a) the updated stack pointer value stored in the output latch is written onto a second bus, and (b) the updated stack pointer value on the second bus is written into a second stack pointer register for storage. During a phase two of the third clock cycle, (a) data is written to memory for storage at a memory location indicated by the stack memory address, and (b) the updated stack pointer value from the second stack pointer register is written into the first stack pointer register for storage.

The above-mentioned objects and other objects of the invention are also provided for by a method and circuitry for performing consecutive instructions to push data off a stack in memory in a digital computer. During a first clock cycle, (a) an instruction is decoded requiring a stack pop operation, and (b) a control indicator is generated calling for a stack pop operation. During a phase one of a second clock cycle, (a) a stack pointer value stored in a selected stack pointer register is written onto a first bus, the selected stack pointer register being one of the either the first stack pointer register or the second stack pointer register, and (b) the stack pointer value in the selected first stack pointer register is written into an input latch of a stack pointer adder. During a phase two of the second clock cycle, (a) a stack memory address is formed by using the stack pointer value on the first bus, (b) the stack pointer value stored in the input latch of the stack pointer adder is incremented by a delta amount to form an updated stack pointer value, and (c) the updated stack pointer value is stored in an output latch. During a phase one of a third clock cycle, (a) the updated stack pointer value stored in the output latch is written onto a second bus, and (b) the updated stack pointer value on the second bus is written into a second stack pointer register for storage. During a phase two of a third clock cycle, (a) data stored in a memory location indicated by the stack memory address is read, and (b) the updated stack pointer value from the second stack pointer register is written into the first stack pointer register for storage.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which:

FIG. 1 is a diagram of a prior art memory organization with a stack;

FIG. 2 is a block diagram of the architecture of a microprocessor;

FIG. 3 is a block diagram of the integer execution data path of the microprocessor;

FIG. 4 is a block diagram of stack pointer circuitry for the microprocessor;

FIG. 5A is a timing diagram for the microprocessor for a sequence of stack operations;

FIG. 5B is a legend for the timing diagram of FIG. 5A.

FIG. 6B is a timing diagram for the microprocessor for an operation involving writing to a stack pointer register followed by two stack operations.

FIG. 6B is a legend for the timing diagram of FIG. 6A.

DETAILED DESCRIPTION

FIG. 2 is a block diagram of the architecture of a 32-bit microprocessor 60 that includes integer execution data path unit 76.

Data path unit 76 contains stack pointer logic, described in more detail below, to accommodate pipelined stack operations at a rate of one instruction per clock (if there is no cache miss or page fault). The stack pointer logic includes a dedicated stack pointer adder for a stack pointer update and uses a separate bus—namely, a J bus. The stack pointer logic is described in more detail below.

Data path unit 76 also contains an arithmetic logic unit ("ALU"), a register file, a barrel shifter, a constant ROM, a machine status word ("MSW"), and flags.

Microprocessor 60 is organized as follows. Bus interface unit 62 is responsible for fetching data from an external memory system (not shown). Thus interface unit 62 is also responsible for updating the external memory system when there is a write to memory. Interface unit 62 provides interfaces between XA bus 61, XD bus 63, cache unit 66, and prefetcher unit 64. Bus interface unit 62 is coupled to cache unit 66 via KBA bus 65, which is a bidirectional address bus, and KBWR bus 67. Cache unit 66 sends data to bus interface unit 62 via KBWR bus 67. Bus interface unit sends data to prefetcher unit 64 via KBRD bus 69.

M bus 138, R bus 140, and LA bus 89 provide the main data path for microprocessor 60. M bus 138 couples cache 66 to data bus unit 76 and floating point unit 78. R bus 140 couples cache 66 with segmentation unit 74, data path unit 76, and floating point unit 78. LA bus 89 couples cache 66 with paging unit 72 and segmentation unit 74.

Segmentation unit 74 implements the segmentation part of the overall memory management model. I bus 90 couples data path unit 76 to segmentation unit 74. K2Q bus 73 couples prefetcher unit 64 with segmentation unit 79 and is a 32-bit bus.

Paging unit 72 implements a two-level paging mechanism of the overall memory management model. PA bus 75 is a 22-bit bus that couples paging unit 72 with cache 66.

Floating point unit 78 contains the logic to execute the floating point instruction set associated with microprocessor 60.

Prefetcher unit 64 is responsible for supplying instruction decode unit 68 with raw code data via K1Q bus 71.

Instruction decode unit 68 is responsible for decoding the incoming instructions for microprocessor 60. Instruction decode unit 68 is coupled to control ROM 70 via IWORD bus 77 and Entry Point bus 79.

Microprocessor 60 uses pipelined instructions. The instruction pipeline includes (1) a prefetch stage, (2) a first decode stage, (3) a second decode stage, (4) an execution stage, and (5) a write-back stage. With pipelining, when an instruction goes on to the execution stage, the instruction decode stages can begin for the next instruction.

Instruction decode unit 68 has a two-stage decoding scheme. The first stage decoder 91 ("D1") figures out the type of operation to be performed and the registers to be used. The first stage decoder 91 also generates the entry point to initiate the microcode sequence. The second stage decoder 93 ("D2") handles the capturing of the displacement and immediate data. The second stage decoder 93 also coordinates the early start microinstructions and ensures the completion of the appropriate linear address calculation. The two stage decoders 91 and 92 together with the execution clock form a three-deep pipeline for the incoming instructions.

First decode stage 91 of instruction decode unit 68 generates "ispval" control indicator, which is a multibit control signal. The "ispval" control indicator is sent from first decode stage 92 to data path unit 76 via lines 99. The "ispval" signal is a two-bit signal or indicator that indicates to data path unit 76 whether the current early start microinstruction is a stack push instruction, a stack pop instruction, or neither. An "ispval" signal or indicator of 00 (base 2) indicates that the current early start microinstruction is neither a push instruction nor a pop instruction. An "ispval" indicator of 10 (base 2) indicates that the early start microinstruction is a stack push instruction. An "ispval" signal or indicator of 11 (base 2) indicates that the early start microinstruction is a stack pop microinstruction.

Instruction decode unit 68 also generates a one-bit "irptrq" repeat request control signal. The "irptrq" repeat request control signal is sent from instruction decode unit 68 to data path unit 76 via control lines 99. The "irptrq" repeat request control signal means repeat the early start request. This is to inform the data path unit 76 that the current microinstruction is repeated from the last time and that the stack pointers should be reinforced for the stack operations, as described below.

Control unit 70 is the microcode engine of microprocessor 60. Control unit 70 contains microcoded control ROM 92 and control logic that directs the action of the other units of microprocessor 60, including data path unit 76. Instruction decode unit 68 sends entry point information to microcoded control ROM 92 over entry point bus 79 to indicate the location in control ROM 92 of the first microinstruction of a group of one or more microinstructions to be executed. The microinstructions themselves provide information to control unit 70 for control unit 70 to determine how many microinstructions are to be executed for a given entry point.

The control ROM microinstructions, once executed, provide control for microprocessor 60 and data path unit 76.

Control unit 70 sends microinstructions to segmentation unit 74 via buses 81 and 83. Control unit 70 sends microinstructions to data path unit 76 via buses 81 and 85. Control unit 70 sends microinstructions to floating point unit 78 via buses and 87.

FIG. 3 is a block diagram of the functional units and circuitry making up data path unit 76. Stack pointer adder 114 and stack pointer latch 112 are contained in functional block 318 for the stack pointer and iteration counter ("DITSP") circuitry.

Functional block DREG 316 contains a register file, constant ROM 339, register decoder 314, and shorters and crossers 317. Functional block DREG 316 also contains stack pointer registers ESP 122, SSP 120, and ASP 124 of stack pointer circuitry 110.

Functional block DBCNTR 333 is the bus control functional block that contains random logic to generate control signals for the bus shorters and crossers 317 in the data path, miscellaneus decode and logic to detect hard collisions that cannot be fixed within data path unit 76.

There is a shorter 184 (see FIG. 4) between the M bus and I bus, and there is a shorter 182 (see FIG. 4) between the M bus and the J bus. The enabling of a shorter between any two buses makes those two buses logically equivalent. In microprocessor 60, the write-back to a destination register may overlap with a register transfer (i.e., sourcing) of the next instruction. This makes it possible to write and read to or from the same register at the same time. This writing and reading from the same register at the same time is called a register collision. In a "soft" collision situation, data path unit 76 inhibits the source buses from being driven from the register file. It activates the appropriate shorter, thereby getting the new value on the bus.

The shorter 184 between the M bus and I bus is a one way shorter, only shorting the M bus to the I bus. The shorter 182 between the M bus and J bus is also only a one way shorter, shorting the M bus to the J bus.

Stack pointer and iteration counter control circuitry 310 ("DITSPR") is coupled by lines 217 to (1) to stack pointer and iteration counter circuitry 318 and (2) functional block DREG 316 lines 217. Bus control functional block DBCNRT 333 is coupled to block DREG 316 via lines 217. DITSPR control circuitry 310 and bus control circuitry DBCNTR 333 provide control signals for stack pointer logic 110 (See FIG. 4). Control signals sent from DITSPR control circuitry 310 to stack pointer circuitry 110 via lines 217 control the sending of values to the I bus and J bus during stack operations. The control signals sent via lines 217 are used to control stack pointer adder 114 (see FIG. 4) during stack operations. DITSPR control circuitry 310 also provides control signals for the stack pointer registers in stack pointer circuitry 110. Control circuitry DBCNTR 333 sends control signals to shorters 182 and 184 via lines 217 during certain stack operations.

DITSPR control circuitry 310 receives control signals from the instruction decode unit 68 (see FIG. 2) via control lines 99.

The data path unit 76 performs all the ALU operations, and the ALU is contained in functional block DALU block 322. Functional block DALUR 304 contains the control logic for use in the setting of several of the ALU flags. Functional block DOPR 302 contains logic for the ALU decode.

Functional block DBS 320 contains the barrel shifter for data path unit 76. Functional block DBSR 308 contains random logic for the barrel shifter in DBS 320.

Functional block DFLAGR 306 contains the user visible flags and the machine status word flags.

FIG. 4 is a block diagram of stack pointer logic circuitry 110. As described above, portions of circuitry 110 reside in block DITSP 318 (such as stack pointer adder 114) and other portions reside in block DREG 316 (such as shorters 182 and 184 and registers ESP 122, ASP 124, and SSP 120). Control circuitry DBCNTR 33 sends control signals to shorters 182 and 184 via lines 217 during certain stack operations.

FIG. 4 shows a dedicated stack pointer adder ("SPAdder") 114 for updating stack pointers during the execution of stack operation instructions. SPAdder 114 receives control signals from stack pointer and iteration counter control circuitry 310 (see FIG. 3) via lines 217. An input A to SPAdder 314 comes via lines 131 from stack pointer input latch 118. In input B to SPAdder 114 comes from multiplexer 116 via lines 133. An output of SPAdder 114 is coupled to stack pointer output latch ("SPLATCH") 112 via lines 129.

SPLATCH 112 receives control signals via lines 217 from iteration counter and stack pointer control circuitry 310 (see FIG. 3). One output from SPLATCH 112 is coupled to I bus 90 via lines 127. Another output of SPLATCH 112 is coupled to J bus 147 via lines 125.

The J bus 147 is an internal bus for data path unit 76 and is dedicated for stack pointer update. I bus 90 is a separate bus for data for address formation. I bus 90 runs between data path unit 76 and segmentation unit 74 (see FIG. 2). As described above in connection with FIG. 2, M bus 138 is part of the main data path for microprocessor 60.

Shorter 182 is a shorter for transferring data from M bus 138 to J bus 147. In a preferred embodiment of the present invention, shorter 182 is a one way shorter which transfer data only in the direction from M bus 138 to J bus 147 and not from J bus 147 to M bus 138. When shorter 182 is enabled, J bus 147 is made logically equivalent to M bus 138. Shorter 182 is comprised of CMOS gates. Shorter 182 is controlled by DBCNTR control circuitry 333 (see FIG. 3) via lines 217. Shorter 184 is a one way shorter between M bus 138 and I bus 90, and thus allows a transfer of data only from M bus 138 to I bus 90 and not from I bus 90 to M bus 138. Shorter 184 is also comprised of CMOS gates, and is controlled by DBCNTR control circuitry 333 via lines 217. When shorter 182 is enabled, I bus 90 is made logically equivalent to M bus 138.

Shorters 182 and 184 reside in shorters and crossers functional block 317, which is part of register functional block 316 shown in FIG. 3. Shorter 182 has access to M bus 138 and J bus 147 in functional block 317, and shorter 184 has access to I bus 90 and M bus 138 in functional block 317.

Registers ESP 122, SSP 120 and ASP 124 are three stack pointer registers used to support push and pop instructions requiring one execution clock. Registers ESP 122, ESP 120, and ASP 124 are each 32-bit registers.

In the preferred embodiment of the present invention, microprocessor 60 uses the segmentation memory addressing technique, wherein the memory space is divided into separate linear segments. Each memory address therefore consists of two parts: a segment part that identifies the segment and an offset part that gives a byte offset within the segment.

Stack registers ESP 122, SSP 120, and ASP 124 are registers for storing various offsets for the stack memory address. Segmentation unit 74 (see FIG. 2) coupled to I bus 90 is used to form linear addresses based on offset values received from I bus 90 and base addresses stored in a set of descriptor registers in segmentation unit 74.

In a preferred embodiment of the present invention, microprocessor 60 uses a stack that grows towards lower addresses. The location of the data stored in the stack is defined by the address of the base register plus an offset.

Register ESP 122 is a user visible stack pointer register. At the end of the pipeline for a single instruction, the base value contained in a stack base register plus the offset value contained in register ESP 122 identifies the memory location that is the "top" of the stack in memory. The "top" of the stack is the memory location containing the data most recently pushed onto the stack.

Register SSP 120 is the shadow stack pointer register used for instruction restart. The offset value stored in register ESP 122 is sent for storage to register SSP 120 via lines 137 in the phase one of the execution clock cycle for a stack push and pop operation.

Register ASP 124 is the advanced stack pointer register. The advanced stack pointer register 124 is used by the data path unit 76 as a place to store the updated value of the stack offset until the current instruction reaches its execution stage and conditions for the update of register ESP 122 are fulfilled. In any event, the updated offset value stored in register ASP 124 is sent for storage to register ESP 122 in the phase two of the execution clock cycle for a stack push and pop operation.

Registers ESP 122, SSP 120, and ASP 124 are each controlled by the stack pointer and iteration counter control circuitry 310 via lines 217.

User visible stack pointer register ESP 122 is coupled to I bus 90 via lines 165. Register ESP is coupled to J bus 147 via lines 161. Register ESP 122 is also coupled to M bus 138 via lines 167. Register ESP is coupled to register SSP 120 via lines 137. Moreover, register ESP 122 is coupled to register ASP 124 via lines 139.

Advance stack pointer register ASP 124 is coupled to I bus 90 via lines 163. Register ASP is also coupled to J bus 147 via lines 141.

Input latch 118 is coupled to J bus 147 via lines 135. Latch 118 is controlled by stack pointer and iteration counter control circuitry 310 via lines 217.

During a phase one of a second decode stage for a stack push operation or a stack pop operation, the data on J bus 147 is latched into latch 118 via lines 135 under the control DITSPR control circuitry 310.

Byte count 0 is provided as an input to multiplexer 116 via lines 153. A byte count of plus or minus 2 is provided as an input to multiplexer 116 via lines 151. A byte count of plus or minus 4 is provided as an input to multiplexer 116 via lines 149. The output of multiplexer 116 is coupled to input B of SPAdder 114 via lines 133. Multiplexer 116 is controlled by DITSPR control circuitry 310 via lines 217.

The byte counts of 0, plus or minus 2, and plus and minus 4 provided as inputs to multiplexer 116 are the possible byte counts by which the current stack pointer value can be incremented or decremented by stack pointer adder 114. For example, if a byte count of minus 2 is passed through multiplexer 116 via lines 133 to input B of SPAdder 114, that means that the current stack pointer value latched in input latch 118 and applied to input A of stack pointer adder 114 has to be decremented by 2 bytes. In contrast, if a byte count of plus 4 is passed through multiplexer 116 via lines 133 to input B of SPAdder 114, that means that the current stack pointer value latch in input latch 118 and provided as input A to stack pointer adder 114 has to be incremented by 4 bytes. Given that the stack for microprocessor 60 grows towards lower addresses, it follows that the current or existing stack pointer value is decremented for a stack push operation, and that the current or existing stack pointer value is incremented for a stack pop operation.

Control signal or indicator "spdel" from DITSPR circuitry 310 determines whether the value in the input latch 118 of stack pointer adder 114 will be incremented by zero bytes, two bytes, or four bytes, or decremented by two bytes or four bytes. Zero bytes is the default. Control signal or indicator "spcyin" from DITSPR circuitry 310 is the carry-in for stack pointer adder 114 when there is decrementing by two or four bytes.

FIG. 5 is a timing diagram for three stack push operations in a row and illustrates the sequence of events associated with each stack push operation.

The left side of each of columns 601, 602, 603, 604, and 605 represents phase one of the respective clock cycle. Similarly, the right side of each of columns 601, 602, 603, 604, and 605 represents the phase two of each of the respective clock cycles.

For the first push register instruction, the left side of column 601 represents phase one of the first decode stage D1, and the right side of column 1 represents phase two of the first decode stage D1. In addition, for the first push operation, the left side of column 602 represents phase one of the second decode stage D2, the right side of column 602 represents phase two of the second decode stage D2, the left side of column 603 represents phase one of the execution stage, and the right side of column 603 represents phase two of the execution stage or execution clock cycle.

For the second push register instruction, the first decode stage is shown in column 602, the second decode stage is shown in column 603, the execution clock cycle or stage is shown in column 604.

For the third push register instruction, the first decode stage is shown in column 603, the second decode stage is shown in column 604, and the execution stage for the second push register instruction is shown in column 605.

The prefetch stage of the instruction pipeline for each instruction is not shown in FIG. 5. The prefetch stage occurs prior to the first decode stage for each respective instruction in the pipeline.

For microprocessor 60, during the prefetch stage of the instruction pipeline, an instruction is prefetched from memory via bus interface 62, KBRD bus 69, prefetcher 64, and K1Q bus 71. The instruction is then sent to instruction decode unit 68 (see FIG. 2). For a stack push operation, an instruction requiring a push operation is prefetched from memory during the prefetch stage.

During phase one of a first decode stage, the instruction prefetch from memory is decoded in first decode stage 91 of instruction decode unit 68. For the first push register operation in FIG. 5, this is shown by D1PLA in row 501 of column 601.

During phase two of the first decode stage for the first instruction, first decode unit 91 of instruction decoder 68 sends out control indicator "ispval" on lines 99 to DITSPR control unit 310 of data path unit 76. Control indicator "ispval" is a two-bit signal. For a push operation, indicator "ispval" would be 10 (base 2), which would indicate to data path unit 76 that the current early start microinstruction is a push instruction. The sending of control indicator "ispval" in phase two of the first decode stage is shown in FIG. 5 as "ISPVAL1" in row 503 of column 601. The numeral 1 following ISPVAL indicates in FIG. 5 that this is the first push operation of the sequence of push operations.

The DITSPR control circuitry 310 reads the "ispval" signal sent over lines 99 and determines that a push operation is to occur. DITSPR circuitry 310 also knows the byte count by which the current stack pointer has to be decremented for the push operation. The byte count will be decremented by either two or four.

DITSPR control circuitry 310 of FIG. 3 contains a state machine 392 that decides whether the present push instruction immediately follows a prior stack operation (i.e., either a prior push or pop operation). State machine 392 of DITSPR 310 operates as follows. State one is an idle state. Once a stack operation occurs—either a push or pop operation—then state machine 392 goes to state two. State machine 392 stays in state two if stack operations continue to follow one right after the other. If no push or pop operation immediately follows the present push or pop operation, however, then state machine 392 goes back to state one.

State machine 392 of DITSPR control circuitry 310 determines which of the registers ESP 122 or ASP 124 places its value on I bus 90 during phase one of the second decode stage. State machine 392 of control circuitry DITSPR 310 sends signal "spsel" via lines 217 to either register ESP 122 or register ASP 124 to indicate which of those registers is to place data on I bus 90. If state machine 392 is in state one, then the stack pointer offset value in register ESP 122 is placed on I bus 90. On the other hand, if state machine 392 is in state two, then the stack pointer offset value in register ASP 124 is instead placed on I bus 90. This means that for a stack operation that does not immediately follow a prior stack operation, the stack pointer offset value in register ESP 122 is placed on I bus 90 during the first phase of the second decode stage. But if a stack operation immediately follows a prior stack operation, then the stack pointer offset value in register ASP 124 is placed on I bus 90 and the offset value in register ESP 122 is not placed on I bus 90 during the first phase of the second decode stage.

The state machine 392 circuitry of DITSPR control circuitry 310 determines that the first stack push operation in FIG. 5 does not immediately follow a prior stack operation. Therefore, during phase one of the second decode stage, the stack pointer offset value stored in user visible stack pointer register ESP 122 is written onto I bus 90 via lines 165. This is shown in FIG. 5 in column 602 rows 503 and 504 by "ESP" with an arrow pointing to "IBUS".

As noted above, control circuitry DITSPR 310 knows that this push operation does not immediately follow a prior stack operation, so therefore the offset value stored in register ESP 122 is written onto J bus 147 via lines 161. The stack pointer offset value written on to J bus 147 from register ESP 122 is then written into input latch 118 via lines 135 during that same phase one of the second decode stage of the first push register instruction. This value stored in latch 118 then becomes an input A to stack pointer adder 114.

During phase one of the second decode stage for the first push operation, the control signal "gdel" is sent from DITSPR control circuitry 310 via lines 217 to multiplexer 116 of stack pointer logic circuitry 110. A "gdel" value of 0 means do a two byte increment or decrement, and a gdel value of one indicates that an increment or decrement of four bytes is to be done. The sending of the "gdel" signal is shown in rows 506 in column 602 of FIG. 5 by "GDEL1."

During phase two of the second decode stage of the first push stack operation, segmentation unit 74 (see FIG. 2) forms a linear address that is placed on LA bus 89. Segmentation unit 74 forms this linear address by receiving the current stack pointer offset value that had been placed on I bus 90 from ESP register 122. Segmentation unit 74 contains a linear address adder (not shown) that decrements the offset value received on I bus 90 by either two bytes or four bytes, depending on the value of control signal "gdel." If "gdel" is 0, then the offset value is decremented by two bytes. If "gdel" is one, then the offset value on I bus 90 is decremented by four bytes. Segmentation unit 74 then adds the resulting decremented offset value to a base address for the stack. The base address is stored in a base address register for the stack in segmentation unit 74.

During that same phase two of the second decode stage, the linear address so formed by segmentation unit 74 is placed on LA bus 89 and sent to paging unit 72 and cache unit 66. The forming of the linear address and its placement on LA bus 89 is shown in FIG. 5 by "LAADD" at row 503 in column 602.

"RGDCD" in row 505 in column 602 of FIG. 5 indicates that during the phase two of the second decode stage, the information from the present microinstruction is being decoded to determine which register of microprocessor 60 is to have its contents pushed as data onto the stack for storage.

Also during phase two of the second decode phase for the first instruction, stack pointer adder 114 decrements the stack pointer offset value stored in input latch 118 by two or four bytes, depending on the value passed through multiplexer 116 to input B of SPAdder 114 via lines 133. Control signal gdel sent to multiplexer 116 via lines 217 from control circuitry DITSPR 310 indicates whether the decrementing is to be by two bytes or four bytes as noted above, (a "gdel" of 0 indicates two bytes and a "gdel" of one indicates four bytes). The fact that the stack operation is a push operation indicates that stack pointer adder 114 is to decrement the value stored in input latch 118 rather than increment the value stored in latch 118. The resulting decremented offset stack pointer value is transferred from SPAdder 114 to SPLatch 112 (also called output latch 112) via lines 129 for storage during that same phase two of the second decode stage for the first stack instruction. The decrementing of the stack pointer offset value by SPAdder 114 and the storage of the resulting decremented valued in SPLatch output 112 is shown by "SPADD" in row 506 of column 502 in FIG. 5.

During phase one of the execution clock cycle for the first push operation, paging unit 72 receives the linear address on LA bus 89. Paging unit 72 uses a translation lookaside buffer ("TLB") (not shown) within paging unit 72 to form a 22-bit paging address that is placed on PA bus 75 and sent to cache unit 66. The translation lookaside buffer is a four-way set associative page table cache. It automatically keeps the most commonly used page table entries in microprocessor 60. During that same phase one of the execution stage, a ten-bit linear address continues to reside on LA bus 89, which is coupled to cache unit 66 also. The step of forming the paging address is shown by "TLB" in row 502 of column 603 of FIG. 5.

The data from the register which is having its data pushed onto the stack is transferred onto R bus 140 during this same phase one of the execution stage for the first push operation. This data transfer is shown by "RGXTR" in row 504 of column 603 of FIG. 5.

Also during phase one of the execution stage for the first push operation, the updated value of the stack pointer offset stored in stack pointer output latch 112 is written or transferred from SPLatch 112 to J bus 147 via lines 125. The updated stack pointer offset value stored on J bus 147 is then transferred to advanced stack pointer register ASP 124 via lines 141. This step is shown in row 506 of column 603 of FIG. 5 by "ASP" with an arrow pointing towards "ASP."

During phase one of the execution phase of the first push instruction, the stack pointer offset value stored in ESP register 122 is transferred or written into shadow stack pointer register SSP 120 as part of a shadowing step. This shadowing is used in the event of a page fault or a cache miss as described below. The shadowing into register SSP 120 is shown by "SSP" with an arrow pointing towards "SSP" in row 507 of column 603 of FIG. 5.

During phase two of the execution stage for the first push instruction, data from the register having its data pushed onto the stack is transferred to cache 66 of microprocessor 60 for storage at a memory address that is comprised of the paging address on PA bus 75 and the linear address on LA bus 89. The leftmost bits of the memory address are comprised of the 22-bits on PA bus 75. The rightmost 10-bits for that same memory address are the ten bits on LA bus 89. The data is transferred to memory via cache unit 66, KBA bus 65, KBWR bus 67, bus interface unit 62, XA bus 61, and XD bus 63. The data is thus pushed onto the stack in memory. This transfer of data to memory is represented by "CACHE" on row 502 in column 603 of FIG. 5.

In that same phase two of the execution stage of the first push instruction, the updated stack pointer offset value stored in advanced stack pointer register ASP 124 is transferred or written from ASP register 124 to user visible stack pointer register ESP 122 via lines 139. This is step represented in FIG. 5 by "ESP" with an arrow pointing towards "ESP" in row 507 of column 603.

Clock cycle four in column 604 of FIG. 5 would be the write-back stage for the pipeline for the first push operation. Nevertheless, by the end of phase two of the execution stage in column 603, the data has been pushed onto the stack and the purpose of the first push operation has been accomplished.

FIG. 5 also illustrates a second push operation immediately following the first push operation. The first decode stage ("D1") for the second push operation begins in the second clock cycle, which is shown as column 602 in FIG. 5. Thus, the first decode stage for the second push operation coincides in time with the second decode stage for the first push operation. In a similar manner, the second decode stage for the second push operation occurs in the third clock cycle, which is the same clock cycle as the execution stage of the first push operation. The execution stage for the second push operation occurs during the fourth clock cycle, which is the same clock cycle as the write-back stage for the first push operation. The write-back stage for the second push operation occurs during clock cycle five, which is column 605.

The steps of the pipeline of the second push operation shown in FIG. 5 are similar to the steps of the first push operation in FIG. 5. The first decode stage for the second push operation begins in the second clock cycle. For the second push operation, state machine 392 in DITSPR control circuitry 310 is in the second state because the second push operation immediately follows a prior stack push operation. Therefore, the control signal generated by DITSPR 310 via lines 217 to stack pointer circuitry 110 indicates that the stack pointer value to be placed on I bus 90 during phase one of the second decode phase is to be taken from the ASP register 124 rather than ESP register 122. This is shown by "ASP" with an arrow towards "IBUS" in rows 510 and 511 of column 603 of FIG. 5. The data in register ASP 124 is thus placed on I bus 90 during the first phase of the third clock cycle, which is also the time that the stack pointer value in SPLatch 112 is being placed on J bus 147 for the first push instruction. Moreover, during that same first phase of the third clock cycle, the stack pointer value on J bus 147 is being transferred to ASP register 124 via lines 141 for the first stack push operation. Therefore, for the second push operation, the value from ASP register 124 being placed on I bus 90 in phase one of the third clock cycle is the same value that was placed on J bus 147 from stack pointer output latch 112 during that same first phase of the third clock cycle.

Thus, when a stack operation immediately follows a prior stack operation, the register ASP 124 is used to placed data on I bus 90 during the first phase of the second decode stage rather than the register ESP 122 because the most recent updated stack pointer value stored in register ASP 124. This follows from the fact that during the second phase of the second decode stage for the first push operation in FIG. 5, there was a decrementing by stack pointer adder 114 of the stack pointer value stored in input latch 118 and a storing of this value in SPLatch 112.

FIG. 5 also shows a third push operation occurring immediately after the second push operation. The first decode stage of the third push operation occurs during the third clock stage, which is column 603. The second decode stage for the third push operation occurs during the fourth clock stage which is column 604. The execution phase for the third push operation occurs during the fifth clock cycle, which is column 605.

For the third push operation, state machine 392 of DITSPR circuitry 310 will also be in state two given the fact that the third push operation immediately follows a prior stack operation. Therefore, in the first phase of the second decode stage of the third push operation, the stack pointer value placed on I bus 90 is taken from ASP register 124 rather than from ESP register 122. If a stack operation does not immediately follow the third push stack operation, then the state machine 392 in DITSPR circuitry 310 will return to state one. That means that the first stack operation of any future stack operations will take the stack pointer value from ESP register 122 and place it on the I bus during the first phase of the second decode stage of that stack operation.

The pointer update diagram shown in rows 523 through 525 in FIG. 5 shows which register will have its contents transferred onto I bus 90 during the next phase one (of the next clock cycle). State machine 392 of DITSPR circuitry 310 determines which one of registers ASP 124 and ESP 122 will have its contents transferred. The transitions of state machine 392 from state one to state two, and from state two to state one, occur in phase two, if they occur. Control indicator "ispval" tells state machine 392 whether another stack operation has been received.

In the event of a page fault or a cache miss for the first stack operation in the third clock cycle, register ESP 122 recovers the value stored in register SSP 120. In other words, register ESP 122 retrieves its prior value from register SSP 120. A cache miss occurs when a location in cache 66 is empty. A page fault occurs when a page has not been loaded into memory yet from a disk. If there is a page fault or a cache miss then the second stack push operation will freeze at the end of the second decode stage of the second instruction until the first stack instruction gets out of that instruction's execution stage. The third instruction will also not enter its second decode stage. Therefore, the first decode stage request for the third instruction is repeated in the fourth clock cycle, and the data path unit 76 is informed that it is a repeat request.

It can be seen from FIG. 5 that if there is not a page fault or a cache miss, then each of the push instructions can be executed in just one clock cycle. The use of a dedicated stack pointer adder 114 in addition to the linear address adder of segmentation unit 74 results parallelism that generally yields a performance gain.

The instruction pipeline for a stack pop operation is similar to the instruction pipeline for a push operation. There are differences, however. For example, one difference occurs phase two of the second decode phase. During a phase of the second decode stage for a pop operation, a linear address is formed by segmentation unit 74 and placed on LA bus 89. The linear address is simply formed by having the linear address adder of segmentation unit 74 add the stack pointer offset value on I bus 90 to a base address stored in a base register in the segmentation unit 74. The segmentation unit 74 does not decrement or increment the stack pointer offset value stored on I bus 90. In contrast, for a stack pop operation, however, stack pointer adder 114 increments, rather than decrements, the value stored in latch 118 by the byte amount passed through multiplexer 116 to stack pointer adder input B.

A further difference occurs during the phase two of the execution clock cycle for a pop operation. For a pop operation, data is read from memory rather than written to memory. (Data is read from a memory address having left-most bits comprised of the 22-bits of the paging address on PA bus 75 and right-most bits comprised of the ten bits of the linear address on LA bus 89).

Furthermore, during a write-back stage of a pop operation, data read from the memory is then stored in a data register.

The process of stack pointer update described above with respect to FIG. 5 is applicable when there are two or more stack operation in a row. Those stack operations could, for example, be a push, a pop, and then a push. Other combinations of push and pop stack operations are also covered, including more than three stack operations in a row. For example, there could be four pop operations in a row, or six push operations followed by a pop operation. In alternative embodiments of the present invention, stack operations could follow, for example, (1) a MOV ESP, X operation, (2) an ADD ESP, 6 operation, or (3) arithmetic or other operation where register ESP 122 is the destination register and M bus 138 is used during the operation.

FIG. 6 illustrates the situation of an operation involving a write to a stack pointer register operation being immediately followed by one or more stack operations. Specifically, FIG. 6 illustrates the instruction pipelines for a move operation immediately followed by two stack pop operations in row. The MOV ESP, (ESP+N) operation involves (1) taking the value stored in register ESP 122, (2) adding a value N to it in order to form an address, (3) retrieving the data stored at that address, and then (4) storing that data in register ESP 122.

For the move instruction of FIG. 6, the prefetch stage where an instruction is prefetched from memory is not shown.

During phase one of the first decode stage for the move instruction shown in FIG. 6, instruction decode unit 68 decodes the move instruction.

This instruction decode is shown by D1PLA in row 701 of column 801 of FIG. 6. During the phase two of the first decode stage for the move instruction, instruction decode unit 68 sends a request for an operation involving a write to the user visible stack pointer register ESP 122. This is shown by IIBS in row 702 of column 801 of FIG. 6. During a phase one of the second decode phase of the move operation, the stack pointer offset value stored in register ESP 122 is transferred to I bus 90.

The second decode stage for the move operation falls within the second clock cycle. The first decode stage for an immediately following pop instruction also falls within the second clock cycle. During a phase one of a second clock cycle, the instruction decode unit 68 decodes the first pop instruction. This is shown by D1PLA in row 707 in column 802 in FIG. 6.

For the move operation, the first decode stage falls within the first clock cycle, the second decode stage falls in the second clock cycle, the execution phase falls within the third clock cycle, and the write-back phase falls within the fourth clock cycle.

For the immediately following pop instruction, the first decode stage falls within the second clock cycle, the second decode stage falls within the third clock cycle, the second decode stage is repeated in the fourth clock cycle, and the execution phase occurs during the fifth clock cycle.

For the second pop instruction, the first decode stage occurs during the third clock cycle, the first decode stage is repeated during the fourth clock cycle, the second decode stage occurs the fifth clock cycle, and the execution stage occurs the fifth clock cycle.

For the move instruction, during phase two of the second clock cycle, the segmentation unit 74 uses the stack pointer value on I bus 90 to form together with a base address to form a linear address that is placed on LA bus 89. This is shown by "LAADD" in row 703 of column 802 in FIG. 6.

Also during the second phase of the second clock cycle, instruction decode unit 68 sends a request for a pop operation to data path unit 76. This is shown by "SPVL1" in row 708 in column 802 in FIG. 6.

During phase one of the third clock cycle for the move instruction, paging unit 72 receives the linear address on LA bus 89. The paging unit 72 then uses its translation lookaside buffer to form a paging address that is placed on PA bus 75. This is shown by "TLB" in row 703 of column 803 in FIG. 6.

CIMD is the microinstruction field containing information indicating which register will be written into during the write-back clock for the instruction. In FIG. 6, CIMD for the move operation indicates that register ESP 122 will be written into during the write-back stage. CIMD appears in phase one of the third clock cycle of FIG. 6.

Also in the first phase of the third clock cycle, for the pop instruction, the stack pointer offset stored in register ESP 122 is placed on I bus 90. This is shown in rows 709 and 710 of column 803 in FIG. 6.

In the first phase of the third clock cycle, the "gdel" signal indicating the byte size for the necessary pop increment value is sent to multiplexer 116 via lines 217 from DITSPR control circuitry 310. This is shown by "GDEL1" in row 712 of column 803 in FIG. 6. Also in phase one in the third clock cycle, the stack pointer offset value stored in ESP 122 is written onto J bus 147 and, in turn, written into latch 118 via lines 135.

Moreover, during this first phase of the third clock cycle, which is the second decode phase for the first pop instruction, the second decoder 93 of instruction decode unit 68 detects a collision.

The collision comes from the fact that the first pop instruction will be performing a linear address add LAADD operation in phase two of the third clock cycle, which would use the existing value stored in register ESP122 that has been placed on I bus 90 in phase one of the third clock cycle. But the content of register ESP 122 is to be updated in upcoming phase one of the fourth clock cycle. Therefore, the linear address add LAADD would be erroneous unless it uses the updated value to be stored in register ESP 122. In other words, there is a collision because the source register ESP 122 for the linear address add to be performed in phase two of the third clock cycle will be updated in phase 1 of the fourth clock cycle.

Moreover, during phase one of the third clock cycle, instruction decode unit 68 decodes the second pop instruction. This is shown in FIG. 6 at row 714 at column 803.

During the phase two of the third clock cycle, data is read from the microprocessor's memory from a memory location having a memory address that is comprised of the paging address on PA bus 75 and the linear address on LA bus 89. This is shown by "CACHE" at row 703 and column 803 of FIG. 6.

The "RGDCD" in row 705 of column 803 of FIG. 6 indicates that "CIMD" is decoded in phase two of clock cycle 3. The decoding of CIMD reveals that register ESP 122 will be the register that will be written into during the write-back stage of the move instruction.

During the phase two of the third clock cycle, instruction decode unit 68 sends a further "ispval" signal to data path unit 76 that indicates that a pop instruction has been decoded. This is shown by "ISPVAL1" in row 708 of column 803.

During the phase two of the third clock cycle, segmentation unit 74 forms a linear address based on the value on the stack pointer offset value placed on I bus 90. The linear address formed by segmentation unit 74 is placed on LA bus 89. The linear address is being formed during the pipeline for the first pop instruction following the move instruction. Therefore, the linear address is formed by having the segmentation unit 74 using a linear address adder to add the offset value on I bus 90 to a base address stored in a base address register in segmentation unit 74. This is shown by "LAADD" in row 709 of column 803 in FIG. 6.

In phase two of the third clock cycle, second decode unit 93 of instruction decoder 68 sends a repeat request control signal to data path unit 76 via lines 99. This is shown by "RPTRQ" in row 170 of column 803 of FIG. 6. This indicates to data path unit 76 that data path unit 76 should repeat portions of the second decode stage of the first pop instruction.

Data path unit 76 detects a "soft" collision with the CIMD field.

During phase two of the third clock cycle, a bubble is placed in the pipeline for the second pop instruction. In other words, the pipeline for the second pop instruction freezes until the second phase of the fourth clock cycle.

The fourth clock cycle is the write-back clock cycle for the Move instruction. During phase one the fourth clock cycle, data appearing on M bus 138 is written into user visible stack pointer register esp 122 via lines 167.

Also during phase one of the fourth clock cycle, shorter 182 is used to short M bus 138 to J bus 147. Also during phase one of the fourth clock cycle, shorter 184 is used to short M bus 138 to I bus 90. Therefore, J bus 147 and I bus 90 are each made logically equivalent to M bus 138, and the data becomes the same on J bus 147, M bus 138, and I bus 90. The shorting of M bus 138 to J bus 147 is shown in row 709 of column 804 of FIG. 6. The shorting of M bus 138 to I bus 90 is shown in row 710 of column 804 of FIG. 6.

During phase two of the fourth clock cycle, segmentation unit 74 is used to form a linear address that is put on LA bus 89. This occurs for the first pop instruction in FIG. 6, so the linear address is formed by adding the offset value on I bus 90 to the base address in a base register in segmentation unit 74.

Also in phase two of clock cycle four, the value in latch 118 is incremented by SPAdder 114 by the byte amount that is passed through multiplexer 116 to input B of SPAdder 114.

Also in phase two the fourth clock cycle, instruction decode unit 68 sends a signal to data path 76 that the second pop instruction is occurring.

During a phase one of the fifth clock cycle, paging unit 72 receives a linear address value on LA bus 89. Paging unit 72 uses its translation lookaside buffer to form a paging address that is placed on PA bus 75. This is indicated by "TLB" in row 709 in column 805 in FIG. 6.

The data is shorted to J bus 147 in phase one of clock four and is then latched into latch 118 and run through SPAdder 114. SPlatch is then placed on J bus 147 in phase two of clock four. Then in phase one of clock five, ASP 124 gets the value from the J bus 147.

During phase one of the fifth clock cycle, the stack pointer value in register 122 is written into shadow stack pointer register SSP 120 via lines 137. This is shown in row 713 at column 805 in FIG. 6.

During phase one the fifth clock cycle, the stack pointer offset value is register ASP 124 is written onto I bus 90. This is shown in rows 716 and 717 of column 805 in FIG. 6.

Also in phase one of the fifth clock cycle, signal "GDEL" is sent to multiplexer 116 via line 217 from DITSPR unit 310.

During phase two of the fifth clock cycle, data is read from memory at the stack memory address for the pop instruction. This is indicated by "CACHE" in row 709 of column 805 of FIG. 6.

Also in phase two of the fifth clock cycle, the offset value in register ASP 124 is written into register ESP 122.

In phase two of the fifth clock cycle, segmentation unit 74 also generates a linear address that is placed on LA bus 89. This linear address generation is for the second pop instruction. Therefore, the linear address is formed by adding the offset value on I bus 90 to the based address stored in the base register in segmentation unit 74. This is shown by "LAADD" in row 716 in column 805 of FIG. 6.

In the second phase of the fifth clock cycle, the stack pointer value in latch 118 is incremented by the byte amount that passes through multiplexer 116 to stack pointer adder 114, given that this is the a pop instruction. This shown by "SPADD" in row 718 in column 805 of FIG. 6.

In the sixth clock cycle for the second pop instruction shown in FIG. 6, the paging unit 72 forms a paging address placed on PA bus 75. Moreover, the updated stack pointer value in stack pointer latch 112 is written onto J bus 147 via lines 125. The updated value on J bus 147 is then written into advanced stack pointer register ASP 124 via lines 141. In addition, the offset value in register ESP 122 is then stored in shadow stack pointer register 120.

During phase two of the sixth clock cycle, data stored in memory is read from the stack memory address. Furthermore, the data stored in ASP register 124 is then stored in register ESP 122.

In FIG. 6, the pointer update at rows 722, 723, and 724 indicates by the arrow which register will have its contents transferred onto the I bus 90 during the next phase one in case a request comes.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a digital computer, a computer implemented method of performing consecutive instructions to push data onto a stack in memory, comprising the computer implemented steps of:

(1) during a first clock cycle, decoding an instruction requiring a stack push operation and generating a control indicator calling for a stack push operation;

(2) during a phase one of a second clock cycle, performing steps comprising:
  (a) writing onto a first bus a stack pointer value stored in a selected stack pointer register, the selected stack pointer register being one of a first stack pointer register and a second stack pointer register;
  (b) writing the stack pointer value stored in the selected stack pointer register into an input latch of a stack pointer adder;

(3) during a phase two of the second clock cycle, performing steps comprising:
  (a) forming a stack memory address by using the stack pointer value on the first bus;
  (b) decrementing the stack pointer value stored in the input latch of the stack pointer adder by a delta amount to form an updated stack pointer value;
  (c) storing the updated stack pointer value in an output latch;

(4) during a phase one of a third clock cycle, performing steps comprising:
  (a) writing onto a second bus the updated stack pointer value stored in the output latch;
  (b) writing the updated stack pointer value on the second bus into the second stack pointer register for storage;

(5) during a phase two of the third clock cycle, performing steps comprising:
  (a) writing data to memory for storage at a memory location indicated by the stack memory address;
  (b) writing the updated stack pointer value from the second stack pointer register into the first stack pointer register for storage.

2. The method of claim 1 for pushing data onto a stack, wherein the first stack pointer register is a user-visible stack pointer register.

3. In a digital computer, a computer implemented method of performing consecutive instructions to pop data off a stack in memory, comprising the computer implemented steps of:

(1) during a first clock cycle, decoding an instruction requiring a stack pop operation and generating a control indicator calling for a stack pop operation;

(2) during a phase one of a second clock cycle, performing steps comprising:
  (a) writing onto a first bus a stack pointer value stored in a selected stack pointer register, the selected stack pointer register being one of a first stack pointer register and a second stack pointer register;
  (b) writing the stack pointer value in the selected stack pointer register into an input latch of a stack pointer adder;

(3) during a phase two of the second clock cycle, performing steps comprising:
  (a) forming a stack memory address by using the stack pointer value on the first bus;
  (b) incrementing the stack pointer value stored in the input latch of the stack pointer adder by a delta amount to form an updated stack pointer value;

(c) storing the updated stack pointer value in an output latch;

(4) during a phase one of a third clock cycle, performing steps comprising:
  (a) writing onto a second bus the updated stack pointer value stored in the output latch;
  (b) writing the updated stack pointer value on the second bus into the second stack pointer register for storage;

(5) during a phase two of the third clock cycle, performing steps comprising:
  (a) reading data from a memory location indicated by the stack memory address;
  (b) writing the updated stack pointer value from the second stack pointer register into the first stack pointer register for storage.

4. The method of claim 3 for popping data off a stack, wherein the first stack pointer register is a user-visible stack pointer register.

5. The method of claim 3 for popping data off a stack, further comprising the step of:
  (6) during a phase one of a fourth clock cycle, storing in a register the data read from the memory location indicated by the stack memory address.

6. In a digital computer with pipelined instructions, a computer implemented method for performing consecutive instructions to push data onto a stack in memory, comprising the computer implemented steps of:
  (1) during a first clock cycle, decoding an instruction requiring a stack push operation and generating a control indicator calling for a stack push operation;
  (2) during a phase one of a second clock cycle, performing steps comprising:
    (a) if the stack push operation does not immediately follow a prior stack operation, then:
      (i) writing onto a first bus a stack pointer value stored in a first stack pointer register; and
      (ii) writing the stack pointer value stored in the first stack pointer register into an input latch of a stack pointer adder;
    (b) if the stack push operation immediately follows a prior stack operation, then:
      (i) writing onto a first bus a stack pointer value stored in a second stack pointer register; and
      (ii) writing the stack pointer value stored in the second stack pointer register into the input latch of the stack pointer adder;
  (3) during a phase two of the second clock cycle, performing steps comprising:
    (a) forming a stack memory address by using the stack pointer value on the first bus;
    (b) decrementing the stack pointer value stored in the input latch of the stack pointer adder by a delta amount to form an updated stack pointer value;
    (c) storing the updated stack pointer value in a latch;
  (4) during a phase one of the third clock cycle, performing steps comprising:
    (a) writing onto a second bus the updated stack pointer value stored in the output latch;
    (b) writing the updated stack pointer value on the second bus into the second stack pointed register for storage;
  (5) during a phase two of the third clock cycle, performing steps comprising:
    (a) writing data to memory for storage at a memory location indicated by the stack memory address;
    (b) writing the updated stack pointer value from the second stack pointer register into the first stack pointer register for storage.

7. The method of claim 6 for pushing data onto a stack, wherein the first stack pointer register is a user-visible stack pointer register.

8. In a digital computer with pipelined instructions, a computer implemented method for performing consecutive instructions to pop data off a stack in memory, comprising the computer implemented steps of:
  (1) during a first clock cycle, decoding an instruction requiring a stack pop operation and generating a control indicator calling for a stack pop operation;
  (2) during a phase one of a second clock cycle, performing steps comprising:
    (a) if the stack pop operation does not immediately follow a prior stack operation, then:
      (i) writing onto a first bus a stack pointer value stored in a first stack pointer register; and
      (ii) writing the stack pointer value stored in the first stack pointer register into an input latch of a stack pointer adder;
    (b) if the stack pop operation immediately follows a prior stack operation, then:
      (i) writing onto a first bus a stack pointer value stored in a second stack pointer register; and
      (ii) writing the stack pointer value stored in the second stack pointer register into the input latch of the stack pointer adder;
  (3) during a phase two of the second clock cycle, performing steps comprising:
    (a) forming a stack memory address by using the stack pointer value on the first bus;
    (b) incrementing the stack pointer value in the input latch of the stack pointer adder by a delta amount to form an updated stack pointer value;
    (c) storing the updated stack pointer value in an output latch;
  (4) during a phase one of a third clock cycle, performing steps comprising:
    (a) writing onto a second bus the updated stack pointer value stored in the output latch;
    (b) writing the updated stack pointer value on the second bus into the second stack pointer register for storage;
  (5) during a phase two of the third clock cycle, performing steps comprising:
    (a) reading data from a memory location indicated by the stack memory address;
    (b) writing the updated stack pointer value from the second stack pointer register into the first stack pointer register for storage.

9. The method of claim 8 for popping data off a stack, wherein the first stack pointer register is a user-visible stack pointer register.

10. The method of claim 8 for popping data off a stack, further comprising the step of:
  (6) during a phase one of a fourth clock cycle, storing in a register the data read from the memory location indicated by the stack memory address.

11. In consecutive digital computer with pipelined instructions and with memory, circuitry for performing a stack operations, comprising:
  (1) circuitry for decoding an instruction requiring a stack operation and for generating a control indicator;
  (2) a first bus;
  (3) a second bus:

(4) a first stack pointer register coupled to the first bus and to the second bus;
(5) a second stack pointer register coupled to the first bus, to the second bus, and to the first stack pointer register;
(6) a stack pointer adder with an input latch coupled to the second bus;
(7) a stack pointer output latch with (a) an input coupled to an output of the stack pointer adder, (b) an output coupled to the first bus, and (c) an output coupled to the second bus;
(8) a state machine that receives the control indicator from the decoding circuitry, wherein the state machine determines whether or not the stack operation immediately follows a prior stack operation;
(9) address circuitry for forming a stack memory address;
(10) means for writing data to memory;
(11) control circuitry coupled to receive the control indicator from the decoding circuitry and coupled to receive an output from the state machine, wherein:
  (a) during a phase one of a second clock cycle,
    (i) if the state machine indicates that the stack operation does not immediately follow a prior stack operation, then the control circuitry generates control signals for:
      (A) writing onto the first bus a stack pointer value stored in the first bus; and
      (B) writing the stack pointer value stored in the first stack pointer register into the input latch of the stack pointer adder;
    (ii) if the state machine indicates that the stack operation immediately follows a prior stack operation, the control circuitry generates control signals for:
      (A) writing onto the first bus a stack pointer value stored in the second stack pointer register; and
      (B) writing the stack pointer value stored in the second stack pointer register into the input latch of the stack pointer adder;
  (b) during a phase two of the second clock cycle, the control circuitry generates control signals for:
    (i) having the address circuitry form a stack memory address by using the stack pointer value on the first bus;
    (ii) if the stack operation is a push operation, then decrementing the stack pointer value stored in the input latch of the stack pointer adder by a delta amount to form an updated stack pointer value;
    (iii) if the stack operation is a pop operation, then incrementing the stack pointer value stored in the input latch of the stack pointer adder by a delta amount to form an updated stack pointer value; and
    (iv) storing the updated stack pointer value in the stack pointer output latch;
  (c) during a phase one of a third clock cycle, the control circuitry generates control signals for:
    (i) writing onto a second bus the updated stack pointer value stored in the stack pointer output latch,
    (ii) writing the updated stack pointer value on the second bus into the second stack pointer register for storage;
  (d) during a phase two of the third clock cycle, the control circuitry generates control signals for:
    (i) writing data to memory for storage at a memory location indicated by the stack memory address if the stack operation is a push operation;
    (ii) reading data from a memory location indicated by at the stack memory address if the stack operation is a pop operation; and
    (iii) writing the updated value from the second stack pointer register into the first stack pointer register for storage.

12. The circuitry of claim 11, wherein if the stack operation is a pop operation, then during a phase one of a sixth clock cycle, the control circuitry generates a control signal for storing in a register the data read from the memory location indicated by the stack memory address.

* * * * *

UNITED STATES PATENT AND TRADEMARK OFFICE
CERTIFICATE OF CORRECTION

PATENT NO.  : 5,142,635
DATED       : August 25, 1992
INVENTOR(S) : Avtar Saini

It is certified that error appears in the above-identified patent and that said Letters Patent is hereby corrected as shown below:

In column 3 at line 41 delete "6B" and insert --6A--

In column 5 at line 41 delete "miscellaneus" and insert --miscellaneous--

Signed and Sealed this

Second Day of September, 1997

Attest:

BRUCE LEHMAN

*Attesting Officer*        *Commissioner of Patents and Trademarks*